J. B. SCHERMERHORN.
Churn.
No. 3,616.
Patented June. 5, 1844.
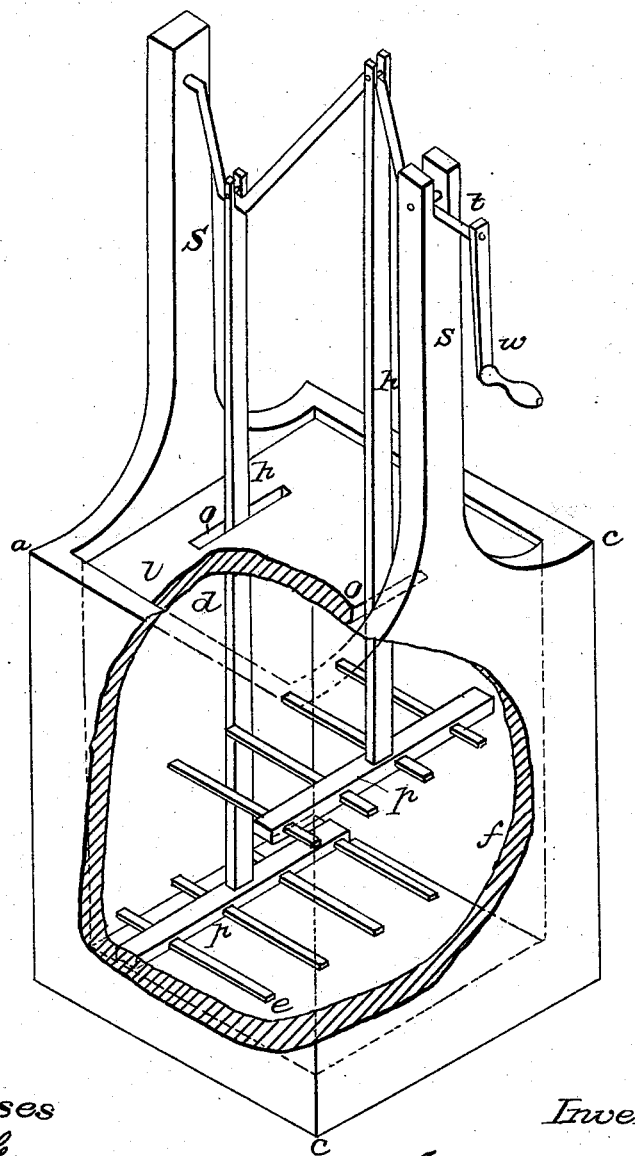
Witnesses
S. Whipple
Wm. B. Schermerhorn
Inventor
Jason B. Schermerhorn

UNITED STATES PATENT OFFICE.

JASON B. SCHERMERHORN, OF DEERFIELD, NEW YORK.

CHURN.

Specification of Letters Patent No. 3,616, dated June 5, 1844.

*To all whom it may concern:*

Be it known that I, JASON B. SCHERMERHORN, of Deerfield, in the county of Oneida and State of New York, have invented a new and useful Improvement in the Construction of Dairy-Churns; and I do hereby declare that the following is a full and exact description thereof, reference being had to the drawing hereunto annexed.

My churn, as I generally construct it, consists of a square, or nearly square wooden box, of a depth from one quarter to one half greater than the width thereof, the bottom being grooved in, or fitted in some other manner so as to be water-tight. This box forms the body of the churn, or vessel in which the churning is to be performed, and its size should be proportioned according to the quantity it is desired to churn at one time. Upon each of two opposite sides of the box, rises a standard ($s$, $s$,) above the top of the box to a height about equal to the depth of the box. These standards may be formed of the same pieces with the sides of the box by which they are respectively supported, or they may be formed of separate pieces, and attached by screws or otherwise. The standards form the supports of a horizontal two-cranked shaft, ($t$, $t$,) which works the two plungers ($p$, $p$,). The two plungers are formed somewhat in the fashion of a hay or garden rake, with the shaft or handle ($h$, $h$,) vertical and the head downward, within the box, the upper ends of the handles being attached to the two cranks of the shaft $t$, $t$, for which purpose the end of the handle may be forked to receive the crank, which may be secured by a pin or otherwise, so as to be readily unshipped when it is desired to withdraw the plungers from the churn. The head piece of the plunger is attached to the lower end of the shaft $h$, at right angles with said shaft, and also with the vertical plane in which the axis of the crank shaft $t$, $t$, is situated, and of a length a very little less than the internal width of the box, so as to move freely up and down therein. The teeth of the plunger pass through the head piece horizontally, and at right angles therewith, projecting on both sides of the head-piece, but unequally; the projection on the side next the center of the churn being twice or thrice as great as on the other side. The length of the pieces forming the teeth should be equal to about two thirds of the width of the box, and so arranged as to distance and position in the two head pieces, that the teeth in the one may pass between those in the other without conflicting, as the plungers pass by one another in working up and down, the one ascending while the other is descending. The tooth pieces may be one inch wide horizontally, by half an inch vertically, or of different size and shape, according to the size of the churn and as found best to answer the purpose they are designed for. The crank may be formed by bending a round iron rod, from one half to five eighths of an inch in diameter into the form of a double crank somewhat like a fulling mill crank, as shown at $t$, $t$, in the drawing, so as to communicate oppositely reciprocating motions to the two plungers $p$, $p$, when the shaft is turned on its axis by the hand winch $w$, or by other means.

The top of the box, or churn body, is covered by a movable lid ($l$, $l$,) having two oblong openings ($o$, $o$,) through which the shafts or rods, ($h$, $h$,) of the plungers work. The length of stroke made by the plunger, will, of course, be equal to the diameter of the circle swept by the crank by which the plunger is moved, and should be equal to, from one half to two thirds of the depth of the churn.

It will readily be seen from the above description, that, as the crank shaft $t$, $t$, is turned an its axis by the winch $w$ or by any other means, the oppositely reciprocating motions of the two plungers, $p$, $p$, with their teeth interraking or passing between one another will produce a violent commotion in the cream or fluid contents of the box, and it is found by trial that this churn performs the operation for which it was designed, with a degree of ease and expedition which, it is believed, have rarely if ever been equaled by any churn of a different construction.

I do not claim the general plan and principle of constructing churns with plungers, worked either by hand, or by crank motion, but What I do claim as my invention and desire to secure by Letters Patent, is—

The mode of constructing dairy churns, with two rake-formed plungers with teeth interraking, and with oppositely reciprocating motions communicated to them by a cranked shaft, as herein, substantially described and set forth.

JASON B. SCHERMERHORN.

Witnesses:
S. WHIPPLE,
WM. B. SCHERMERHORN.